United States Patent
Ryan (10) Patent No.: US 10,120,204 B2
(45) Date of Patent: Nov. 6, 2018

(54) EYEWEAR WITH SLIDABLE AUXILIARY LENSES

(71) Applicant: Vance E. Ryan, Scottsdale, AZ (US)

(72) Inventor: Vance E. Ryan, Scottsdale, AZ (US)

(*) Notice: Subject to any disclaimer, the term of this patent is extended or adjusted under 35 U.S.C. 154(b) by 278 days.

(21) Appl. No.: 14/797,031

(22) Filed: Jul. 10, 2015

(65) Prior Publication Data

US 2017/0010481 A1    Jan. 12, 2017

(51) Int. Cl.
*G02C 9/00* (2006.01)
*G02C 7/08* (2006.01)
*G02C 5/14* (2006.01)

(52) U.S. Cl.
CPC .............. *G02C 7/086* (2013.01); *G02C 5/14* (2013.01); *G02C 9/00* (2013.01)

(58) Field of Classification Search
CPC ............. G02C 7/086; G02C 5/14; G02C 9/00
USPC .......................................................... 351/57
See application file for complete search history.

(56) References Cited

U.S. PATENT DOCUMENTS

| | | | |
|---|---|---|---|
| 4,666,266 A | 3/1987 | Morrison | |
| 6,352,342 B1 | 3/2002 | Huang | |
| 6,942,337 B2 | 9/2005 | Zelman | |
| 7,175,274 B1 * | 2/2007 | Markson | G02C 9/00 351/57 |

FOREIGN PATENT DOCUMENTS

| | | | | |
|---|---|---|---|---|
| GB | 2501562 A | * | 10/2013 | G02C 1/10 |
| WO | WO 9217811 A1 | * | 10/1992 | G02C 7/086 |

* cited by examiner

*Primary Examiner* — Jie Lei
*Assistant Examiner* — Mitchell Oestreich
(74) *Attorney, Agent, or Firm* — Morgan Law Offices, PLC (57) ABSTRACT

One aspect of the disclosure relates to One aspect of the disclosure relates to eyewear, comprising a frame including a front portion and a pair of temples, each of the temples attached on opposite lateral sides of the front portion; a pair of primary lenses mounted to the front portion; and a pair of auxiliary lenses, each lens of the pair of auxiliary lenses mounted to a lens support slidably connected to a track comprising a groove within one of the temples and extending to the front portion. The auxiliary lenses can be positioned near the temples when not in use or moved to the front of the frame to overlap with the primary lens. The auxiliary lens can include various types of lenses including rigid lens. The auxiliary lenses can be corrective to augment the primary lens or tinted, for example.

8 Claims, 7 Drawing Sheets

EYEWEAR WITH SLIDABLE AUXILIARY LENSES

BACKGROUND OF THE INVENTION

1. Field of the Invention

The present invention relates to eyewear, and, more particularly, to eyewear with slidable auxiliary lenses.

2. Description of the Related Art

Common vision conditions correctable by eyewear include nearsightedness (myopia) in which close objects are seen clearly, but objects farther away appear blurred; far-sightedness (hyperopia) in which distant objects are seen clearly, but close objects are not; astigmatism in which blurred vision is caused by an irregular shape of the cornea; and presbyopia in which the lens of the eye becomes less flexible, making focusing on close objects more difficult.

For the vast majority of adults in their 40's and beyond, some degree of presbyopia is present. Frequently, multiple vision conditions are diagnosed, and it is not uncommon to need vision correction for presbyopia as well as hyperopia, and/or astigmatism. Because corrective lens are different for each of these conditions, many people resort to having more than one pair of eyeglasses, such as a pair of eyeglasses for reading and another for driving (to see long distances). Indeed, many people also require eyeglasses to optimize viewing of a computer screen. Additionally, many people find sunglasses useful for driving or outdoor usage. While prescription lens can be tinted, these "prescription sunglasses" will have the same limitations as above, i.e., the user will have to switch to another pair of eyeglasses when a different vision correction is required.

For some, having to own and use several pairs of eyeglasses is inconvenient. If one owns more than a single pair of glasses, it will be necessary to carry all of them around. It will be necessary to find the proper pair of glasses and change to it when needed.

An early innovation in the art was the bifocal lens, which is credited to Benjamin Franklin. A bifocal lens divides a lens into an upper portion and a lower portion, each having a different corrective lens. Accordingly, a user need not have to use separate eyeglasses. Usually, the bottom lens will be for close up viewing (such as reading). Additionally, trifocal lens have been developed that divide the lens into three segments, each having a different corrective lens. Although bifocals/trifocals are used, there is a feeling among some that these eyeglasses are not stylish.

To remedy the problem of style, so-called progressive lens were developed. Progressive lens eliminate the conspicuous line (or lines) that separates the lenses. However, as with bifocals/trifocals, some users report headaches and dizziness. Still others report that it is difficult to adjust their eyes to the proper area of the lenses to use.

Another approach has been to provide auxiliary lenses for placement over the primary lenses. An example is to provide clip-on lenses for reading or tinted clip-on lenses to transform the eyewear to sunglasses. In addition to clipping-on, other ways of attaching the auxiliary lens have been developed. For example, U.S. Pat. No. 6,352,342 to Huang discloses an auxiliary eyewear frame magnetically attachable to the primary frame. As another example, U.S. Pat. No. 6,942,337 to Zelman discloses eyewear having both a primary lens frame and an auxiliary lens frame separately coupled to an eyewear platform. Although useful, both devices are relatively complex and require the user to assemble the device.

Another approach is to structure the temples of the eyewear to store auxiliary lenses, as disclosed in U.S. Pat. No. 4,666,266 to Morrison. Although storage of the auxiliary lens along the side of the eyeglasses (temple) is useful, the auxiliary lens of Morrison must be bent around the hinge portion of the frame through a continuous "channel" when deployed; therefore, they can only be made of a thin, flexible material. As such, the auxiliary lenses will have limited corrective ability, optical quality and practical value.

SUMMARY OF THE INVENTION

One aspect of the disclosure relates to eyewear, comprising a frame including a front portion and a pair of temples, each of the temples attached on opposite lateral sides of the front portion; a pair of primary lenses mounted to the front portion; and a pair of auxiliary lenses, each lens of the pair of auxiliary lenses mounted to a lens support slidably connected to a track comprising a groove within one of the temples and extending to the front portion. The auxiliary lenses can be positioned near the temples when not in use or moved to the front of the frame to overlap with the primary lens. The auxiliary lens can include various types of lenses including rigid lens. The auxiliary lenses can be corrective to augment the primary lens or tinted, for example.

According to another aspect of the disclosure, the track is a dual-groove track having an upper groove and a lower groove. The lower groove is more sharply curved and shorter in length than the upper groove allowing the auxiliary lens to negotiate a sharper turn around the hinge portion of the frame.

According to still another aspect of the disclosure, the eyewear includes the upper dual-groove track and a lower track. The lens supports are suspended from the upper dual-groove track and ride on the lower track. The bottom groove of the upper dual-groove track may include a curved portion allowing the auxiliary lens to take a path ending with the auxiliary lenses behind the primary lenses.

DETAILED DESCRIPTION OF THE INVENTION

Figure 1:
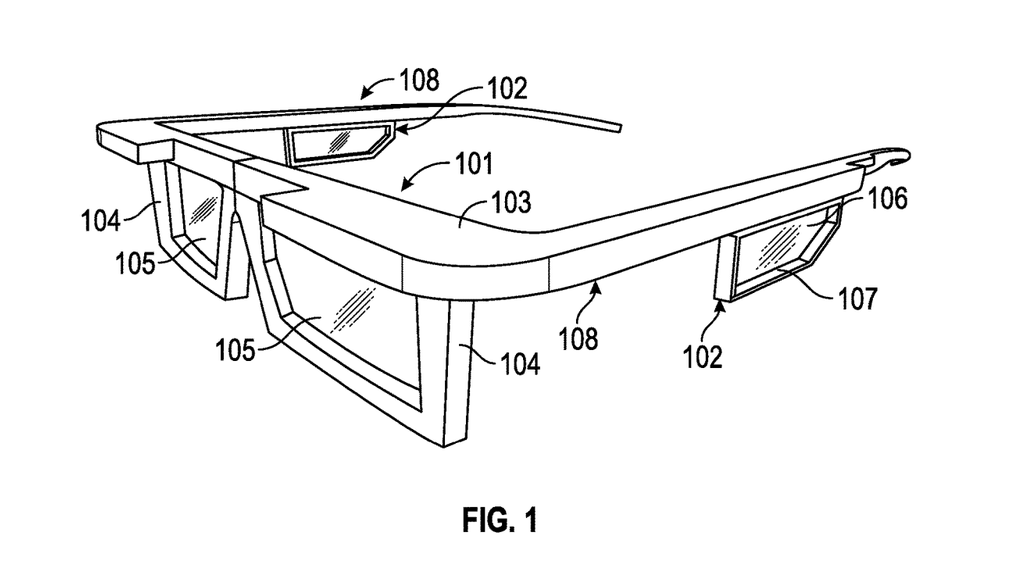
FIG. 1 illustrates a perspective view of exemplary eyewear.

Referring to FIG. 1, a perspective view of eyewear, according to a first embodiment, is illustrated. The eyewear comprises a frame including a front portion 101 and a pair of temples 108 attached on opposite lateral sides thereof, preferably by hinges (not shown). A pair of primary lenses 105 is mounted on rims 104. Although the primary lenses 105 are shown mounted to full rims, it is to be understood that the primary lenses 105 could instead be mounted to half rims or the eyewear could incorporate a rimless design. Additionally, the eyewear includes a pair of auxiliary lenses 106. Each auxiliary lens 106 is mounted to a respective lens support 102 having an enclosing border 107 that holds the auxiliary lens 106. The auxiliary lenses 106 can include various types of rigid lenses such as glass, plastic, polycarbonate, and any other rigid material. The rigid lenses could incorporate any desired qualities including polarization, filters, prisms, and prescription or non-prescription lenses.

Figure 2:
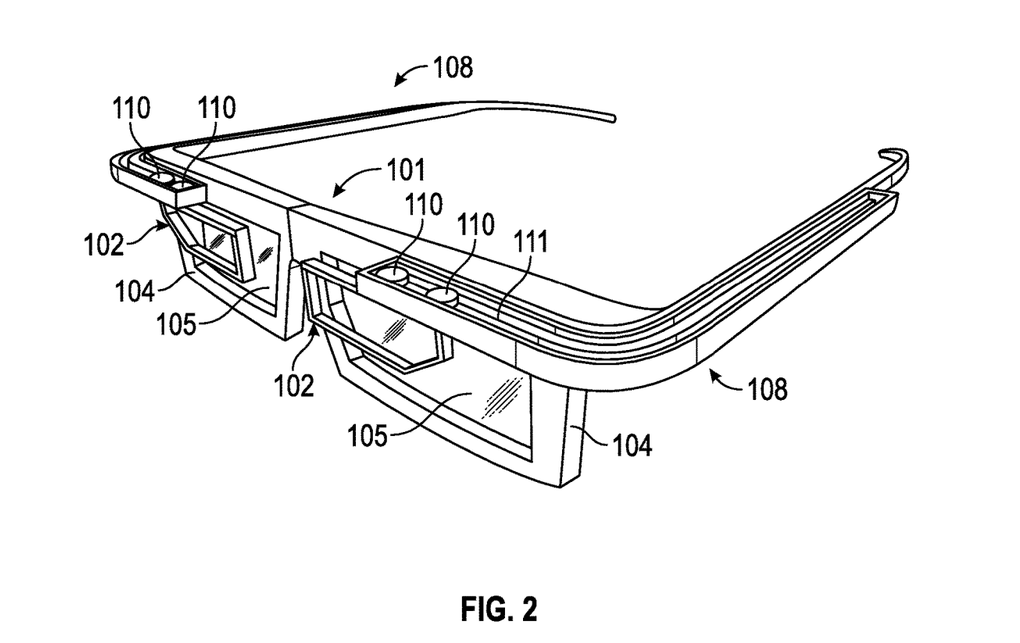
FIG. 2 illustrates a view the eyewear showing a mechanism for auxiliary lenses to slide about a single-groove track, according to a first embodiment.

Referring to FIG. 2, a view of the eyewear exposing tracks 111 is illustrated. As shown, the track covers are removed for illustrative purposes. As will be described in greater detail, each of the lens supports 102 is suspended from one of the tracks 111.

As shown in FIG. 1, the lens supports 102 (with the auxiliary lenses 106) are positioned below the temples 108. This is the position of the auxiliary lenses 106 when not in use. FIG. 2 shows the lens supports 102 positioned in front of the primary lens 105. In this case, the user is able to benefit from the combination of the primary lenses 105 and the auxiliary lenses 106. For example, the auxiliary lenses 106 could be magnifying lenses, such that when combined with the primary lenses 105 allows the user to read without the need to switch to a pair of reading eyeglasses.

Figure 3A:
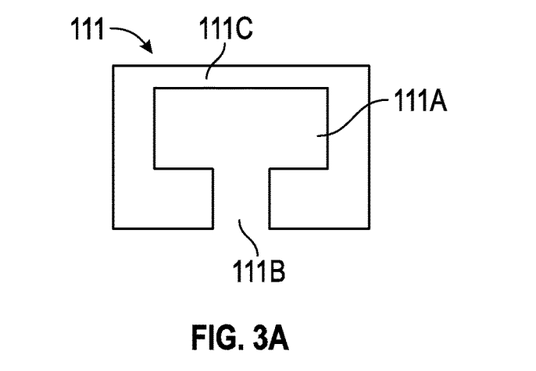
FIG. 3A illustrates a cross-sectional side view of the single-groove track.
Figure 3B:
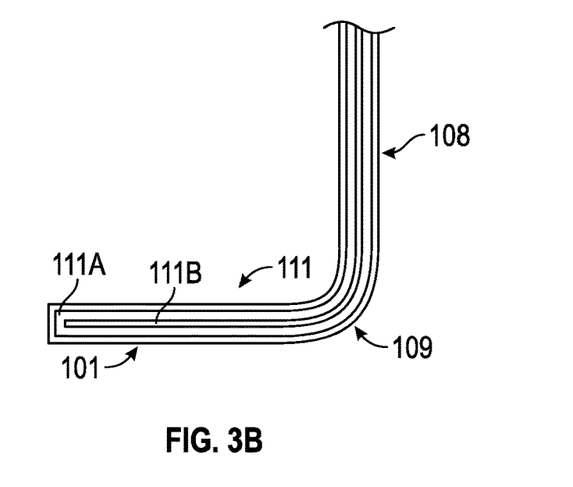
FIG. 3B illustrates a top plan view of the single-groove track with the track cover removed.

Referring to FIG. 3A, a cross-sectional side view of the track 111 is illustrated. As can be seen, the track 111 includes a groove 111A, a groove entrance 111B and track cover 111C. The groove 111A is substantially wider than the groove entrance 111A. FIG. 3B illustrates a top plan view of the track 111 with the track cover 111C removed. The track 111 can be formed in the temple 108. The track 111 extends from the temple 108, around a hinge-portion 109, and terminates adjacent the front portion 101.

Figure 3C:
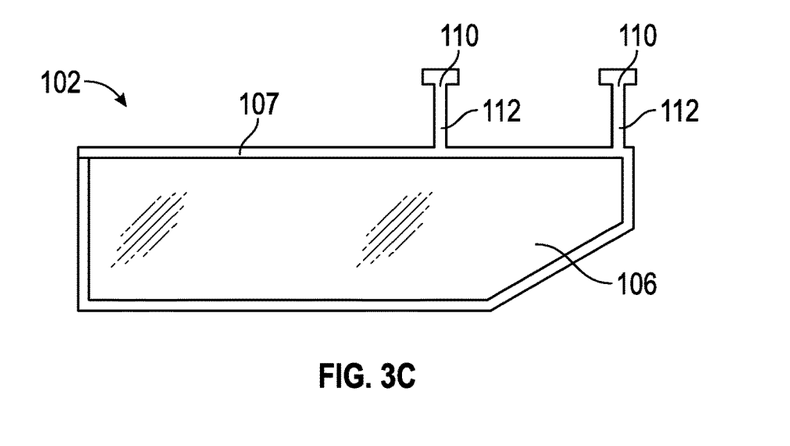
FIG. 3C illustrates a side view of a lens support useable to support one of the auxiliary lens on the single-groove track.
Figure 3D:
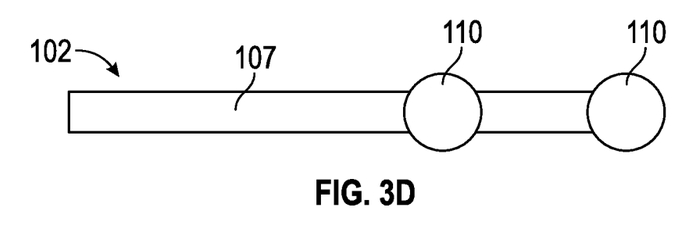
FIG. 3D illustrates a top plan view of the lens support.

Referring to FIG. 3C, a side view of a lens support 102 useable to support one of the auxiliary lens 106 is illustrated. FIG. 3D illustrates a top plan view of the lens support 102. As shown, the lens support 102 includes the enclosing border 107 that surrounds the periphery of the auxiliary lens 106. Although the lens support 107 is a full rim, it is to be understood that the lens support 107 could employ a half rim or other suitable design depending on such factors as cost, weight, and desired style. The lens support 102 also includes a pair of protruding members 112 extending from a top side of the enclosing border 107, each of the protruding members 112 including an end piece 110. The lens support 102 can be a single-piece of molded plastic including the enclosing border 107, the protruding members 112 and the end pieces 110. Alternatively, the enclosing border 107 could be a single piece with the protruding members 112 and/or the end pieces 110 made separately and then attached. The end pieces 110 can be made of a reduced friction material such as nylon or a metal, for example. Although the protruding members 112 and the end pieces 110 are shown as cylindrical, it is to be understood that they could assume another suitable shape. Whatever the shape, it is important that the end pieces fit into the groove 111A and the protruding members 112 fit the groove entrance 111B.

Figure 4:
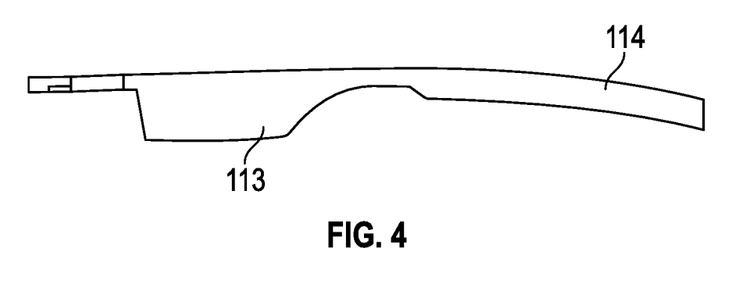
FIG. 4 illustrates an optional eyewear temple capable of storing an auxiliary lens.

Referring to FIG. 4, an eyewear temple 114 capable of storing an auxiliary lens 105, is illustrated. The eyewear temple 144 includes a hollow enclosure 113 that allows a lens support 102 with the auxiliary lens 105 to be stored therein when the auxiliary lenses 106 are not being used. The hollow enclosure 113 includes an opening (not shown) to allow the lens support 102 with the auxiliary lens 105 to travel into, and out from, the hollow enclosure 113. Additionally, the eyewear temple 114 may include a channel to incorporate a bendable push rod that can push/the auxillary lenses 106 into position for use or pull the auxillary lenses 106 into storage within the hollow enclosure 113. The eyewear temple 114 is an optional feature, and may be incorporated into other embodiments of the present invention as well.

Figure 5A:
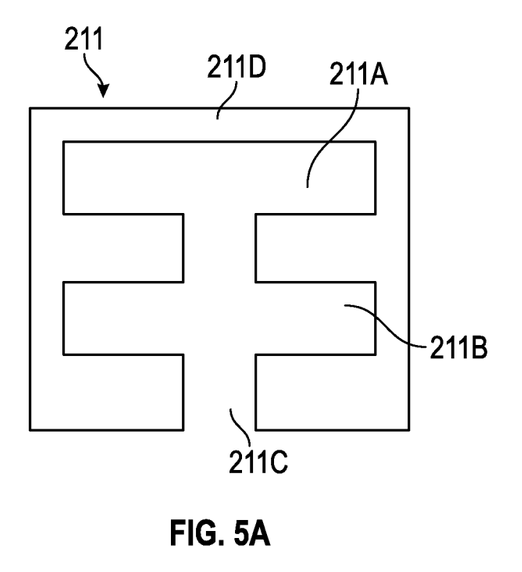
FIG. 5A illustrates a cross-sectional side view of a dual-groove track showing upper and lower grooves, according to a second embodiment.
Figure 5B:
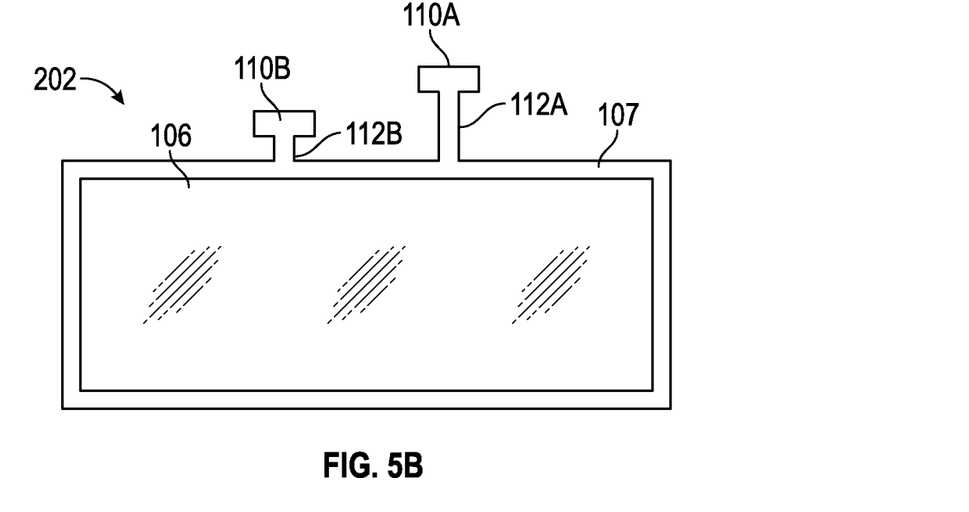
FIG. 5B illustrates a side view of an auxiliary lens support useable with the dual-groove track.

Referring to FIG. 5A, a cross-sectional side view of a dual-groove track 211, according to a second embodiment of the eyewear is illustrated. The dual-groove track 211 includes an upper groove 211A, a lower groove 211B, a groove entrance 211C and a groove cover 211D. FIG. 5B illustrates a side view of an auxiliary lens support 202 useable with the dual-groove track 211. As with the lens support 102, the lens support 202 includes the enclosing border 107 and the auxiliary lens 106 mounted thereto. However, a difference between the lens support 202 and the lens support 102 is that the protruding members 212A, 212B are at different heights, so as to be able to reach the upper groove 211A and the lower groove 210B, respectively.

Figure 5C:
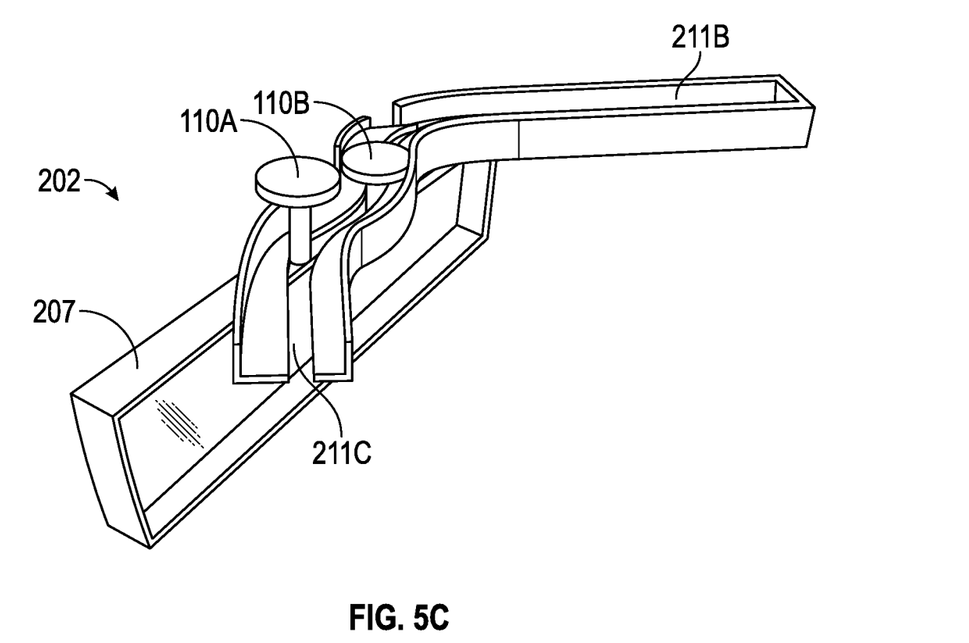
FIG. 5C illustrates a view of the lens support navigating around a turn, the upper groove of the dual-groove track removed for illustrative purposes.
Figure 6A:
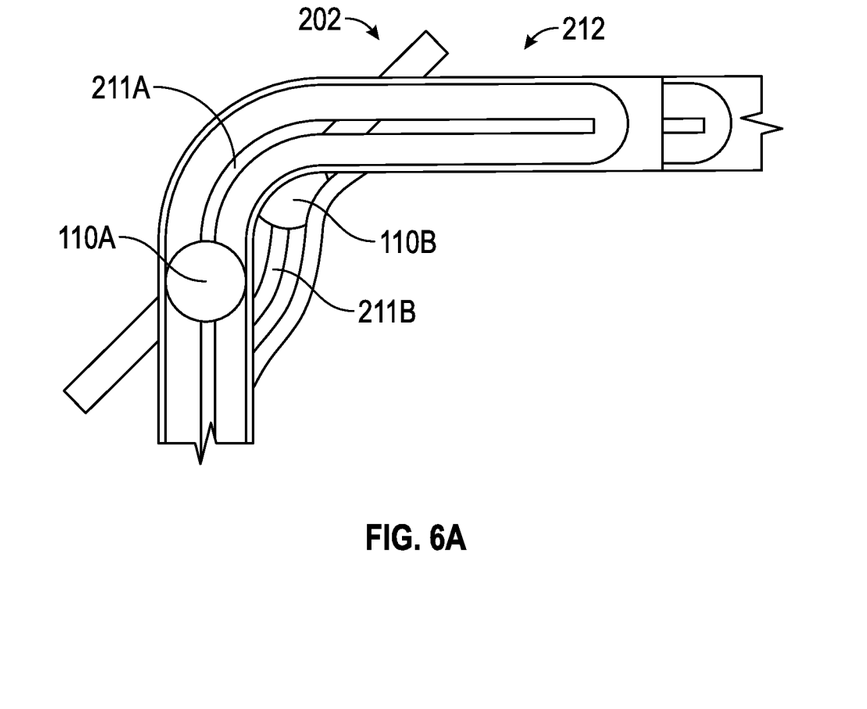
FIG. 6A illustrates a top plan view of the dual-groove track with an auxiliary lens navigating a turn around the hinge-portion of the frame.
Figure 6B:
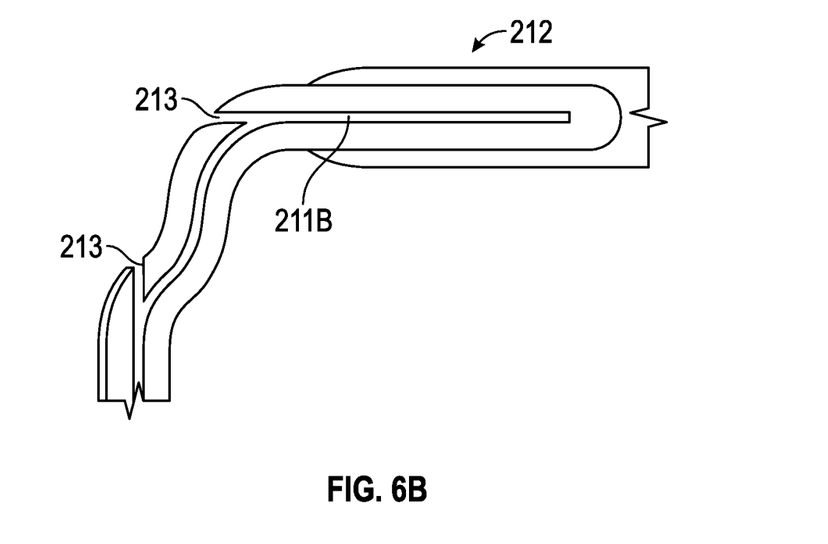
FIG. 6B illustrates a top plan view of the lower track of the dual-groove track.

FIG. 5C illustrates a view of one of the lens supports 202 navigating around a turn, the upper groove 211A of the dual-groove track removed for illustrative purposes. An advantage of the dual-groove track 211 is that the lens support 202 can negotiate a sharper turn around the hinge portion of the frame. FIG. 6A illustrates a top plan view of the dual-groove track 212 with a lens support 202 (and auxiliary lens attached thereto) navigating a turn around the hinge-portion of the frame. As can be seen, the lower groove 211B is more sharply curved than the upper groove 211A. In general, the turning radius of the end piece 110B and the distance between the end piece 110A and the end piece 110B will determine the shape of the pathway of the upper groove 211A. Advantageously, the dual-groove track 211 allows an eyewear design whereby the lens support can come very close to the user's forehead when turning around the hinge portion. FIG. 6B illustrates a top plan view of the lower track 211B. As can be seen, the lower track includes not only the pathway for the end piece 110B but also must allow grooves 213 to accommodate the protruding member 112A which follows the pathway of the upper groove 211A.

Figures 7A, 7B:
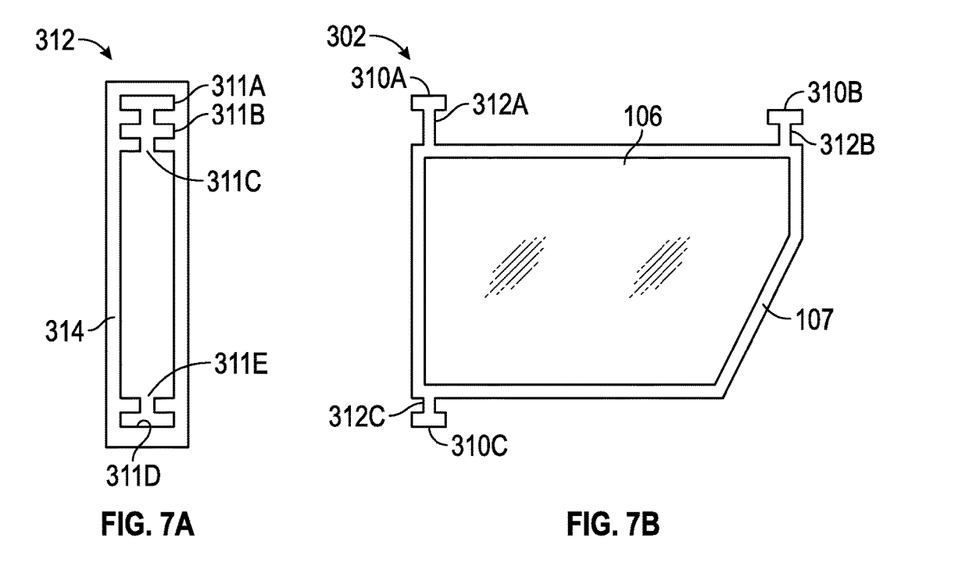
FIG. 7A illustrates a cross-sectional side view of the upper dual-groove track and lower single-groove track, according to a third embodiment.
FIG. 7B illustrates a side view of a lens support useable to support one of the auxiliary lens on the the upper dual-groove track and lower single-groove track.

FIG. 7A illustrates a cross-sectional side view of a combined upper dual-groove track and lower single-groove track structure 312, according to a third embodiment. The structure 312 includes walls 314 disposed between the dual-groove track and lower single-groove track. The dual groove track in the third embodiment includes an upper groove 311A, a lower groove 311B and a groove entrance 311C. The single groove track includes a groove 311D and a groove entrance 311E.

FIG. 7B illustrates a side view of a lens support 302 useable to support one of the auxiliary lens 106. On the top side of the enclosing border 107, protruding members 312A, 312B extend and include end pieces 310A and 310B, respectively. Additionally, the bottom side of the enclosing border 107 includes a protruding member 312C with an end piece 310C. The protruding members 312A, 312B fit into the groove entrance 311C; thus, the protruding member 312A extends to a greater length to allow the end piece 310A to fit into upper groove 311A. The protruding member 312B fits into lower groove 311B. Furthermore, the protruding member 312C fits into the groove entrance 311E and the end piece 310C fits into groove 311D.

Figure 7C:
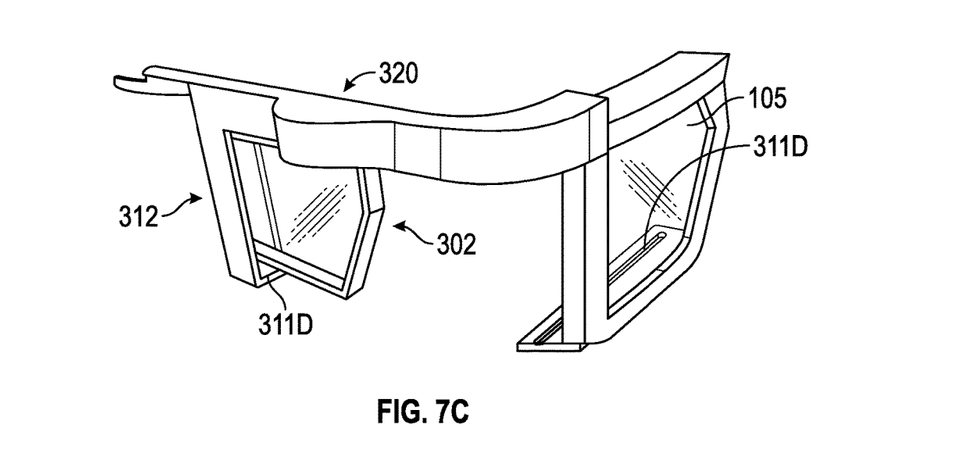
FIG. 7C illustrates eyewear with slidable auxiliary lenses, according to the third embodiment, showing a perspective view of a corner of the eyewear.

FIG. 7C illustrates eyewear with slidable auxiliary lenses, according to the third embodiment, showing a perspective view of a corner of the eyewear. The upper dual groove track including the upper groove 311A and lower groove 311B extend continuously around the corner while the lower single groove track including the groove 311D is discontinuous, as shown.

Figure 7D:
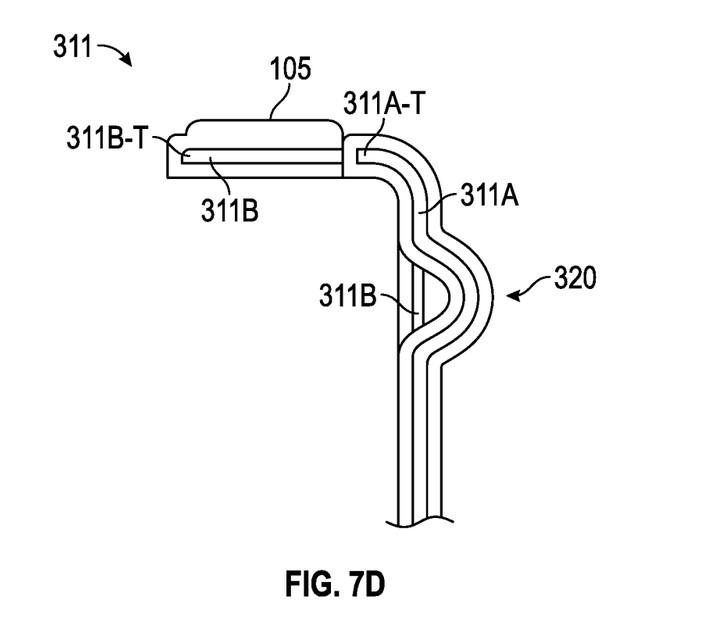
FIG. 7D illustrates a top plan view of the upper dual-groove track.
Figure 7E:
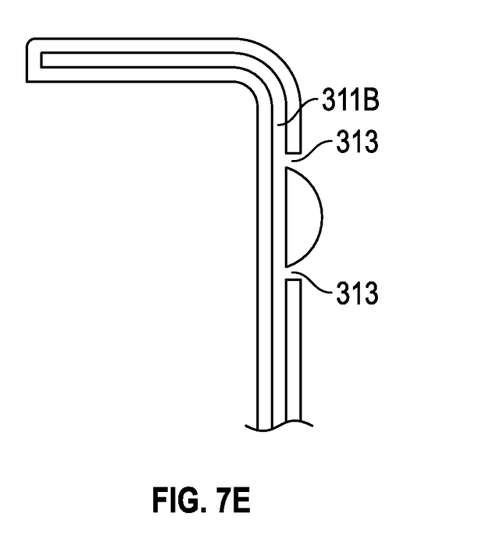
FIG. 7E illustrates a top plan view of the lower groove of the upper dual-groove track.
Figure 7F:
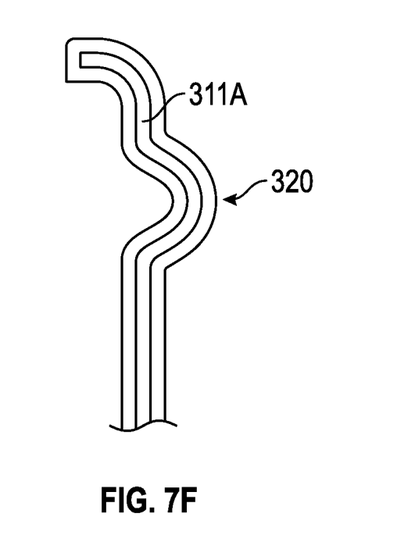
FIG. 7F illustrates a top plan view of the upper groove of the upper dual-groove track.

FIG. 7D illustrates a view of the upper dual-groove track 311 assembled together. It is to be understood that the upper groove 311A is a continuous groove, similar to the upper groove 211A of the second embodiment (see FIG. 6A). In the present embodiment, an objective is to provide a pathway such that the auxiliary lenses 106 end up behind the primary lenses 105 instead of in front of them as was the case in the previous embodiments. To accomplish this, the lower groove 311B extends behind the primary lenses 105 and includes a turn segment 320 to facilitate the necessary sharp turn. When the auxiliary lenses 106 is placed behind the primary lens, the the end piece 310B will be at end point 311B-T and the end piece 310A at end point 311A-T. FIG. 7E illustrates separate views of the lower groove 311B and the upper groove 311A, respectively. Note that the lower groove 311B includes not only the pathway for the end piece 310B but also pathway 313 to accommodate the protruding member 312A which follows a wider pathway as it travels along the turn segment 320.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. Eyewear, comprising:
a frame including a front portion, a pair of hinged portions, and a pair of temples, each of the temples attached to opposite sides of the front portion by a respective one of the pair of hinged portions;
a pair of primary lenses mounted to the front portion; and
a pair of auxiliary lenses, each one of the pair of auxiliary lenses mounted to a lens support slidably connected to a respective track such that the lens support is suspended from the respective track and the auxiliary lens mounted to the lens support is disposed below the respective track;
wherein each lens support is capable of being slid along its track such that respective auxiliary lens and primary lens overlap;
wherein the respective tracks each comprises dual grooves extending from the respective temple around the respective hinge portion and terminating adjacent the front portion, each of the dual grooves comprising an upper groove, a lower groove and a groove entrance, wherein the upper groove is disposed above the lower groove within the respective track, and the groove entrance forms an opening into the lower groove;
wherein each one of the lens supports includes an enclosing border and a pair of dual protruding members extending from an upper surface of the enclosing border, comprising an upper protruding member and a lower protruding member corresponding in height with the upper groove and the lower groove, respectively, each one of the pair of dual protruding members having an end portion structured to fit into one of the respective upper grooves and lower groove; and
wherein each one of the lens supports is suspended from the track by the protruding members and an end portion of the lens support follows a linear path with respect to the groove when the groove is substantially linear and then extends substantially from the track as the lens support navigates around a turn.

2. The eyewear of claim 1, wherein the auxiliary lens and the primary lens overlap comprises the auxiliary lens being positioned in front of the primary lens.

3. The eyewear of claim 1, wherein the end portions are substantially disk shaped.

4. The eyewear of claim 1, wherein the path of the upper groove is longer than that of the lower groove.

5. The eyewear of claim 4, wherein the path of the lower groove is more sharply curved than the path of the upper groove.

6. The eyewear of claim 1, wherein the temples include storage portions structured to enclose the lens supports.

7. The eyewear of claim 1, wherein the auxiliary lenses are able to be being positioned behind the primary lens.

8. The eyewear of claim 1, wherein the auxiliary lenses are rigid.

* * * * *